(12) United States Patent
Yotsui (10) Patent No.: US 6,999,451 B2
(45) Date of Patent: Feb. 14, 2006

(54) CONGESTION-RESPONSIVE VOIP SYSTEM AND CONGESTION AVOIDANCE METHOD FOR VOIP SYSTEM

(75) Inventor: Shinpei Yotsui, Tokyo (JP)

(73) Assignee: NEC Corporation, Tokyo (JP)

( * ) Notice: Subject to any disclaimer, the term of this patent is extended or adjusted under 35 U.S.C. 154(b) by 879 days.

(21) Appl. No.: 10/038,654

(22) Filed: Jan. 8, 2002

(65) Prior Publication Data

US 2002/0093911 A1 Jul. 18, 2002

(30) Foreign Application Priority Data

Nov. 20, 2001 (JP) .............................. 2001-005447

(51) Int. Cl.
*H04L 12/66* (2006.01)
(52) U.S. Cl. ........................................ 370/356; 370/229
(58) Field of Classification Search ........ 370/352–358, 370/493–495, 401, 402, 229, 235; 704/200, 704/503
See application file for complete search history.

(56) References Cited

U.S. PATENT DOCUMENTS

| 6,611,694 B1 * | 8/2003 | Oltedal et al. .............. 455/560 |
| 2002/0018465 A1 * | 2/2002 | Rosenberg .................. 370/356 |

FOREIGN PATENT DOCUMENTS

| JP | 4-252536 | 9/1992 |
| JP | 2000-196599 | 7/2000 |
| JP | 2002-94514 | 3/2002 |

* cited by examiner

*Primary Examiner*—Brenda Pham
(74) *Attorney, Agent, or Firm*—Young & Thompson

(57) ABSTRACT

A congestion-responsive VoIP system according to the present invention can minimize an increase in transmission traffic by simplifying the transmission of congestion data and avoid the degradation of speech quality by avoiding congestion proactively, by enabling a repeater in an IP network connecting a plurality of terminals to add congestion data a 1 or a 0 to speech packets to be transmitted to the terminals; the terminals to receive speech packets with congestion data and detect a congestion condition based on the congestion data; and a call set-up part to determine selectively a coding method according to the congestion condition.

18 Claims, 4 Drawing Sheets

CONGESTION-RESPONSIVE VOIP SYSTEM AND CONGESTION AVOIDANCE METHOD FOR VOIP SYSTEM

BACKGROUNDS OF THE INVENTION

1. Field of the Invention

The present invention relates to a congestion-responsive VoIP system and a congestion avoidance method for VoIP system. In particular, the present invention relates to a congestion-responsive VoIP system that can avoid congestion proactively by detecting congestion in early stages, and a congestion avoidance method for VoIP system.

2. Description of the Related Art

The ITU-T standard H225.0 defines the technology for determining a call coding method responsive to a congestion condition in an IP network. The technology for measuring service quality by use of RTCP reports is known. Examples of types of service quality that can be measured by use of RTCP include packet loss and jitter in arrival intervals. H225.0 proposes switching the medium coding method to the one that transmits at a lower speed or otherwise stopping a less important medium if a condition persists for a long period during which congestion spreads over a network due to an increase in packet loss or jitter in arrival intervals by use of RTCP.

In such a publicly known VoIP system as described above, congestion avoidance actions, for example, changing the coding method and stopping lower-priority channels, are conducted after the occurrence of delay in the arrival of packets and loss of packets. This means that the coding method changing action takes place reactively, instead of proactively, only after the degradation of speech quality has actually been caused.

Thus, the realization of a system is awaited that can avoid congestion proactively before congestion actually occurs by early detection of congestion. Such a system can desirably be implemented in a simplified way.

SUMMARY OF THE INVENTION

An object of the present invention is to provide a congestion-responsive VoIP system that can avoid the degradation of speech quality by avoiding congestion proactively by early detection of congestion, and a congestion avoidance method for VoIP system.

Another object of the present invention is to provide a congestion-responsive VoIP system that can achieve a system for avoiding congestion proactively by early detection of congestion through a simple improvement in the system, and a congestion avoidance method for VoIP system.

According to the first aspect of the invention, a congestion-responsive VoIP system, comprises a plurality of terminals, and an IP network which connects the plurality of terminals, wherein the IP network comprises a repeater, the repeater comprises a congestion value adding part for, based on the amount of data in speech data on the IP network, adding congestion data indicative of congestion conditions to speech packets that are transmitted to the terminals, the terminals comprise a call set-up part for setting up a call and a detecting part for receiving the speech packets and detecting a congestion condition based on the congestion data in the speech packets, and the call set-up part determines selectively a coding method for use in speech communications with the other terminal responsive to the congestion condition.

In the preferred construction, the terminals further comprise a packet transmitting part, and the coding method is notified to the other terminal via the packet transmitting part.

In another preferred construction, congestion data to be added to each speech packet is either a "1" or a "0."

In another preferred construction, the detecting part outputs the severity of congestion for the congestion condition to the call set-up part, based on the ratio of the speech packets to which the "1" has been added as the congestion data to the total.

In another preferred construction, the detecting part outputs the severity of congestion for the congestion condition to the call set-up part, based on the ratio of the speech packets to which the "1" has been added as the congestion data to the total, and the call set-up part determines on a lower-speed coding method if the severity of congestion is higher.

In another preferred construction, the repeater further comprises a congestion predicting part, and the congestion predicting part determines the ratio of speech packets to which the congestion data will be added according to the transmission condition for the speech packets.

In another preferred construction, the repeater further comprises a buffer monitoring part, and the buffer monitoring part notifies the congestion predicting part of the transmission condition, based on the amount of data contained in the speech data.

According to the second aspect of the invention, a congestion avoidance method for VoIP system, comprising the steps of detecting the amount of data contained in speech data over the network using a repeater, based on the amount of data, adding congestion data indicative of a congestion condition to speech packets to be transmitted from the repeater to a terminal, and receiving the speech packets at the terminal, detecting a congestion condition based on congestion data contained in the speech packets, and determining selectively a coding method to be used for speech communications with the other terminal, based on the congestion condition.

In the preferred construction, the congestion avoidance method for VoIP system includes step of setting a "1" or a "0" as the congestion data.

In another preferred construction, the congestion-responsive VoIP system comprises at the terminal, step of detecting the severity of congestion for a congestion condition based on the ratio of the speech packets to which "1" has been added as the congestion data to the total, and determining on a lower-speed coding method if the severity of congestion is higher.

In another preferred construction, the congestion avoidance method for VoIP system comprises step of changing the ratio between the congestion data "1" and "0" to add to the speech packets over the network according to the amount of data.

In another preferred construction, the congestion avoidance method for VoIP system comprises step of changing the ratio between the congestion data "1" and "0" to add to the speech packets over the network according to the amount of data, and step of determining selectively a coding method based on the ratio of "0" and "0."

According to another aspect of the invention, a terminal for a congestion-responsive VoIP system formed with a plurality of terminals and an IP network having a repeater for connecting the plurality of terminals, comprises a call set-up part for setting up a call, and a detecting part for receiving the speech packets to which congestion data indicative of a congestion condition based on the amount of data in speech data over the IP network has been added and detecting the congestion condition based on the congestion data in the speech packets, wherein the call set-up part determines selectively a coding method for use in speech communications with the other terminal responsive to the congestion condition.

In the preferred construction, the terminal for the congestion-responsive VoIP system further comprises a packet transmitting part, comprises notifying the coding method to the other terminal via the packet transmitting part.

In another preferred construction, congestion data to be added to each speech packet is either a "1" or a "0," and the detecting part outputs the severity of congestion for the congestion condition to the call setup part, based on the ratio of the speech packets to which the "1" has been added as the congestion data to the total.

In another preferred construction, the detecting part outputs the severity of congestion for the congestion condition to the call set-up part, based on the ratio of the speech packets to which the "1" has been added as the congestion data to the total, and the call set-up part determines on a lower-speed coding method if the severity of congestion is higher.

In another preferred construction, the repeater further comprises a congestion predicting part, and the congestion predicting part determines the ratio of speech packets to which the congestion data will be added according to the transmission condition for the speech packets.

In another preferred construction, the repeater further comprises a buffer monitoring part, and the buffer monitoring part notifies the congestion predicting part of the transmission condition, based on the amount of data contained in the speech data.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
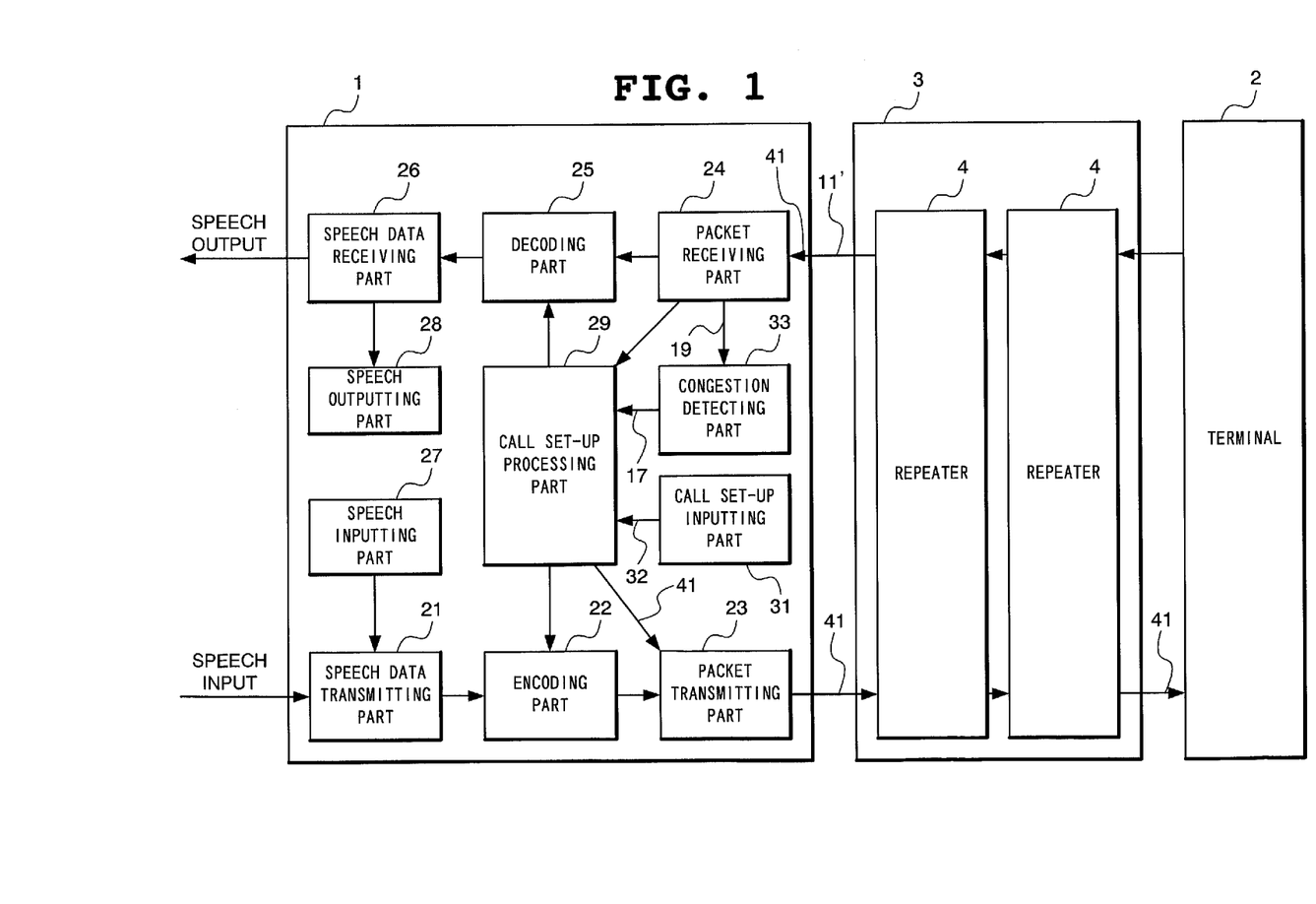
FIG. 1 is a system block diagram showing an embodiment of a congestion-responsive VoIP system according to the present invention.
Figure 2:
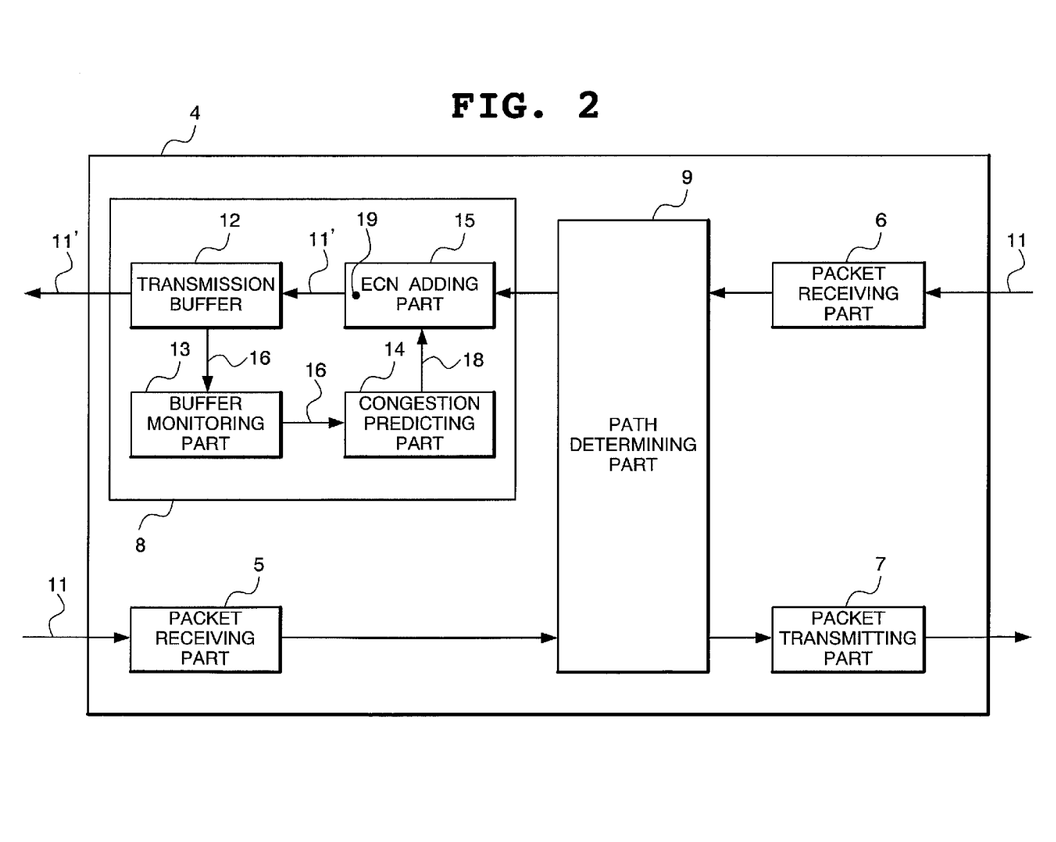
FIG. 2 is a circuit block diagram showing the details of a repeating device.

The present invention will now be outlined with reference to FIGS. 1 and 2.

A congestion-responsive VoIP system according to the present invention comprises a plurality of terminals 1 and 2, and an IP network 3 for connecting between the plurality of terminals 1 and 2. The IP network 3 has a repeater 4, which in turn has a congestion data adding part 15 for adding congestion data 19 to a speech packet 11 to be transmitted to the terminal 1.

The terminal 1 includes a call set-up processing part 29 for setting up a call, and a congestion detecting part 33 for receiving speech packets 11' each with a congestion value and detecting a congestion condition based on the congestion data 19 in the speech packets 11' each with a congestion value. The call set-up processing part 29 determines selectively a coding method, according to the detected congestion condition. Since congestion values are included in speech packets before they are transmitted, the transmission of congestion values is simplified, thereby minimizing traffic increase due to the transmission of congestion values.

The terminal 1 further comprises a packet transmitting part 23, which notifies the coding method to the other terminal. It is rational to place the notification of a coding method to use in a speech packet to be transmitted.

It is particularly rational to use a 1 or 0 as congestion data for addition to a speech packet. In this case, each of the speech packets 11 is added a 1 or 0, allowing the severity of congestion to be represented by the number of speech packets to which the congestion value 1 is added and also allowing the transmission of a speech packet to be utilized as a means of communicating the severity of congestion. The number of packets to which a 1 is added and the arrangement of such packets can easily be determined by using a statistical process. One preferred example of such a statistical process works such that the number of packets to which a 1 is added increases in proportion to the severity of congestion.

The congestion detecting part 33 outputs the severity of congestion for a congestion condition to the call set-up processing part 29, based on the ratio of speech packets 11' to which the data "1" has been added. If the severity of congestion is higher, the call set-up processing part 29 determines selectively a lower-speed coding method.

The repeater 4 further comprises a congestion predicting part 14, which determines the ratio of speech packets to which a "1" will be added according to the transmission condition for speech packets 11. The repeater 4 further comprises a buffer monitoring part 13, which notifies the congestion predicting part 14 of the transmission condition, based on the amount of data contained in speech packets 11. Through such monitoring, the time required for the statistical process is reduced.

A congestion-responsive VoIP system according to an embodiment of the present invention will now be described in more detail with reference to the drawings.

The congestion-responsive VoIP system of the present embodiment is provided with an IP network 3 between a plurality of terminals. In FIG. 1, a VoIP terminal unit 1 (hereinafter referred to as a "terminal") and a VoIP terminal unit 2 (hereinafter referred to as an "opposed terminal"), which is opposed to the terminal unit 1, are shown as an exemplary pair of the plurality of terminals. The IP network 3 is a set in which a plurality of repeating devices 4, which are placed between the terminal unit 1 and terminal unit 2, link together bidirectionally.

FIG. 2 shows the details of a circuit block for a repeating device 4. The repeating device 4 has a first packet receiving part 5 for receiving packets that are transmitted from a terminal unit 1 or an adjacent repeating device 4, and a second packet receiving part 6 for receiving IP packets that are transmitted from other terminal unit 1 or other adjacent repeating device 4. The repeating device 4 further includes a first packet transmitting part 7 for transmitting IP packets to the terminal unit 1 or the adjacent repeating device 4, and a second packet transmitting part 8 for transmitting IP packets to other terminal unit 1 or other adjacent repeating device 4.

Between the first packet receiving part 5 and the first packet transmitting part 7, a path determining part 9 is placed. Between the second packet receiving part 6 and the second packet transmitting part 8, a path determining part 9 of the same circuit configuration is placed. The first packet receiving part 5 and the second packet receiving part 6 feed the packets 11 that they respectively receive from the outside into the path determining part 9. The path determining part 9 determines a path according to the destination address contained in the packet header of the packet 11 received from the first packet receiving part 5 or the second packet receiving part 6, and sends the packet 11 to the first packet transmitting part 7 located along the path or the second packet transmitting part 8 located along the path.

The circuit configuration within the second packet transmitting part 8 is identical to that within the first packet transmitting part 7. FIG. 2 shows the detailed circuit configuration within the second packet transmitting part 8. The second packet transmitting part 8 comprises a transmission buffer 12, a buffer monitoring part 13, a congestion predicting part 14, and an ECN adding part 15. The buffer monitoring part 13 receives the amount of data stored in the transmission buffer 12 from the transmission buffer 12, and records the amount of data as statistical information 16. The statistical information 16 is passed from the buffer monitoring part 13 to the congestion predicting part 14. The congestion predicting part 14, which retrieves the statistical information 16, judges whether or not congestion will occur at the second packet transmitting part 8 in the future, based on the statistical information 16.

If it judges that congestion will occur at the second packet transmitting part 8 in the future, the congestion predicting part 14 calculates to obtain the severity of congestion 18 indicative of the congestion condition of the predictive congestion which has been predicted to occur in the future, and sends the severity of congestion 18 to the ECN adding part 15. The ECN adding part 15 sets a 1, which serves as a congestion notification bit (an ECN bit) 19, in the packet header of the packet 11 that it has received from the path determining part 9 as appropriate for the severity of congestion 18, and sends the packet 11' with a congestion notification bit 19 to the transmission buffer 12. The transmission buffer 12 transmits the packet 11' with a congestion notification bit to the outside via the repeating device 4.

The terminal unit 1, as shown in FIG. 1, comprises a speech data transmitting part 21, an encoding part 22 to which the speech data transmitting part 21 is connected, a packet transmitting part 23 for transmitting packets and to which the encoding part 22 is connected, a packet receiving part 24 for receiving packets, a decoding part 25 to which the packet receiving part 24 is connected, and a speech data receiving part 26 to which the decoding part 25 is connected. Speech that is input into a speech inputting part 27 is converted into a speech conversion electric signal and input into the speech data transmitting part 21 by the speech inputting part 27. The speech conversion electric signal generated by the speech data receiving part 26 is input into the speech outputting part 28 and converted into speech for output from the speech outputting part 28.

The terminal unit 1 further comprises a call setup processing part 29 and a call set-up inputting part 31. The call set-up inputting part 31 is connected to the call set-up processing part 29. The call set-up inputting part 31 outputs a call set-up direction signal 32 for input into the call set-up processing part 29. Receiving a call set-up direction through the call set-up direction signal 32, the call set-up processing part 29 sets up a call between the terminal unit 1 and the opposed terminal unit 2.

The terminal unit 1 further comprises a congestion detecting part 33. The packet receiving part 24 is connected to the congestion detecting part 33, and the congestion detecting part 33 in turn is connected to the call set-up processing part 29. The packet receiving part 24 receives a packet 11' with a congestion notification bit from the transmission buffer 12 of the repeating device 4 on the IP network 3, and transmits the congestion notification bit 19 in the packet 11' with a congestion notification bit to the congestion detecting part 33. The congestion detecting part 33 detects the congestion condition, or the severity of congestion 18, based on the congestion notification bit 19, and passes it as congestion statistical information 17 to the call set-up processing part 29.

The call set-up processing part 29 determines the coding method for use between the terminal unit 1 and the opposed terminal unit 2, based on the call set-up direction by the call set-up inputting part 31 and the severity of congestion 18 received from the congestion detecting part 33, or otherwise changes the coding method if it is during a conversation. When determining or changing a coding method as described above, the call set-up processing part 29 assigns in advance different priorities to calls individually and performs an appropriate action, e.g., determining a less important channel and stopping that channel, as necessary. The coding method resultant from such determination or change is passed from the call set-up processing part 29 to the encoding part 22.

Figure 3:
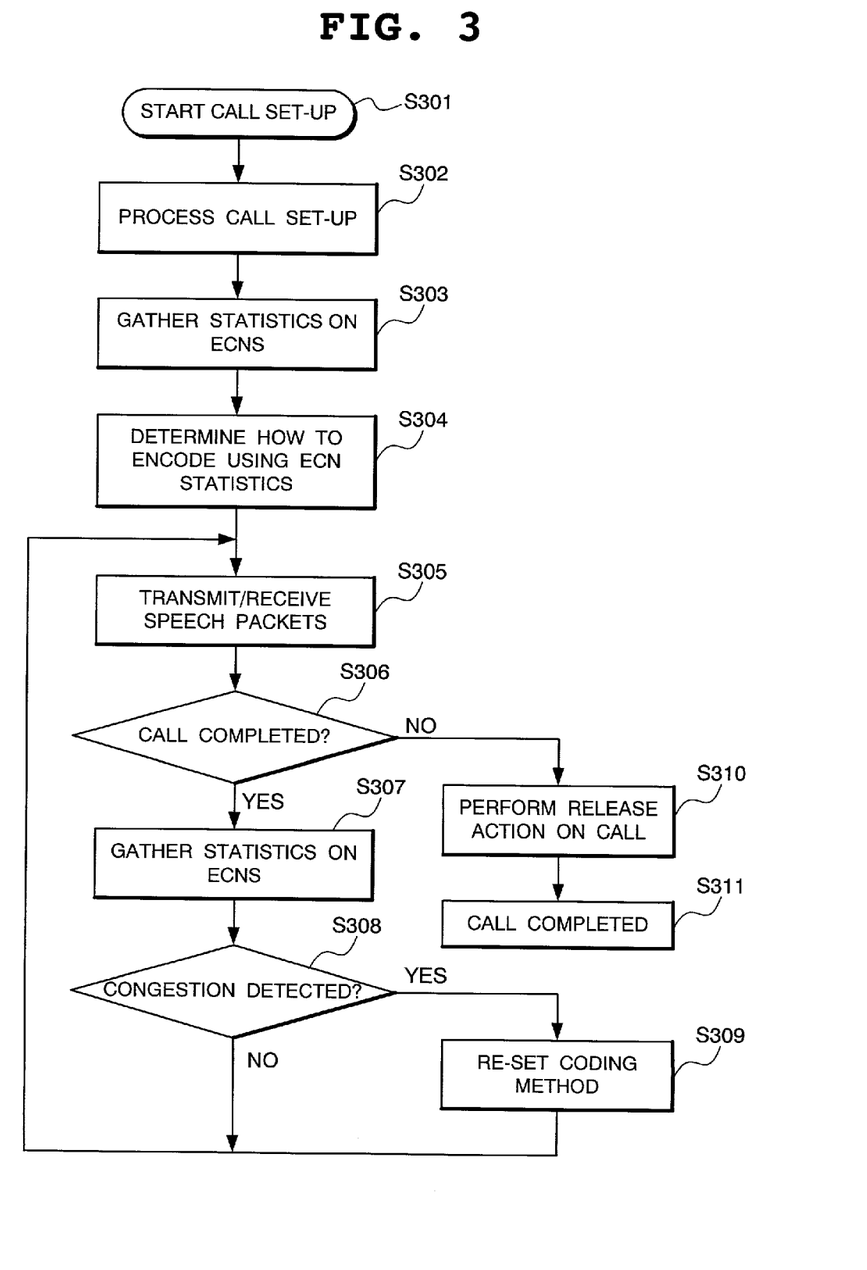
FIG. 3 is an operation flow chart showing the actions taken in a congestion avoidance method for VoIP system according to the present invention.

FIG. 3 shows an embodiment of the congestion avoidance method for VoIP system according to the present invention. A call set-up direction signal 32 that is output from the call set-up inputting part 31 is input into the call set-up processing part 29, upon which the call set-up procedure is performed and a call is started (Step S301). The call set-up processing part 29 interprets the call set-up direction signal 32 to determine what has been requested, obtains the needed call set-up packet through the packet transmitting part 23 and the packet receiving part 24, and sets up a call on the opposed terminal 2, which IP address is retrieved in advance, by performing the call set-up procedure (Step S302), which comprises a plurality of processes: requesting set-up of a call, accepting the request, calling, responding to the call, notifying the capacity of the terminal, and establishing a logical channel.

In Steps S301 to S302, the congestion notification bits 19 sent from the opposed terminal 2, which are among the packets received from the packet receiving part 24, are notified to the congestion detecting part 33. The congestion detecting part 33 checks each of the congestion notification bits 19 and gathers statistics concerning which data has been set, "1" or "0." If it judges that congestion has occurred, the congestion detecting part 33 notifies the congestion statistical information 17 to the call set-up processing part 29 (Step S303). If congestion statistical information 17 is notified by the call set-up inputting part 31 to the call set-up processing part 29, the call set-up processing part 29 determines selectively the coding method to use for the speech call, by considering the severity of the congestion condition based on that congestion statistical information 17 (Step S304).

The coding method thus selected as a result of this determination is notified to the decoding part 25. A coding method designation packet is then generated by the call set-up processing part 29. The coding method designation packet 41 is transmitted to the opposed terminal 2 via the packet transmitting part 23. The terminal 1 transmits the information in the repeating device 41 to the opposed terminal 2 to direct the opposed terminal 2 concerning which coding method will be used commonly between themselves. On the other hand, if the coding method designation packet 41 is received by the packet receiving part 24 from the opposed terminal 2, the coding method designation packet 41 is passed from the packet receiving part 24 to the call set-up processing part 29, and the call set-up processing part 29 notifies the coding method directed by the opposed terminal 2 to the encoding part 22.

When the coding method is indicated and determined as described above, a speech call is started, in which speech packets are transferred from the terminal 1 to the opposed terminal 2 using the designated coding method (Step S305). Speech packets that are sent from the opposed terminal 2 are received by the packet receiving part 24. Upon completion of the calling action (Step S306), the congestion notification bits 19 in the packet headers of these packets are sent to the congestion detecting part 33. The congestion detecting part 33 performs statistical analysis on these congestion notification bits 19 (Step S307).

Speech packets among the packets received by the packet receiving part 24 are decoded by the decoding part 25. The speech packets decoded by the decoding part 25 are converted to speech data by the speech data receiving part 26 and output as speech by the speech outputting part 28. In contrast, the speech that is input by the speech inputting part 27 is first passed to the speech data transmitting part 21, and then encoded as speech data by the encoding part 22 for conversion into speech data using the coding method that has been determined and selected, and finally transmitted from the terminal 1 to the opposed terminal 2.

Figure 4:
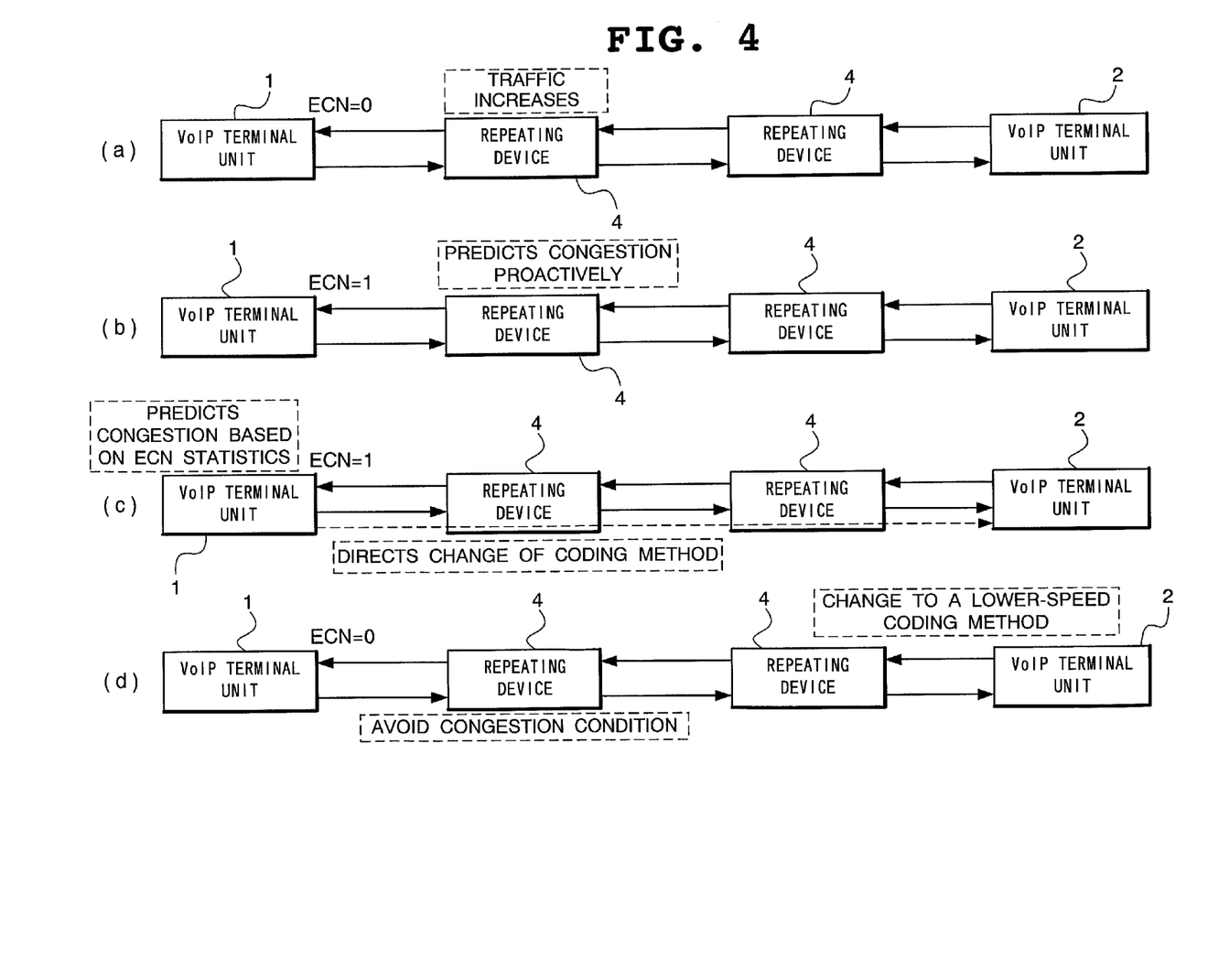
FIG. 4 is a data flow diagram showing the flow of call data indicative of the traffic condition in a speech channel.

If, as shown in FIG. 4(*a*), the traffic of information toward the terminal 1 increases at the repeating device 4 on the IP network 3 to the extent that the occurrence of congestion is predicted, then, as shown in FIG. 4(*b*), the ECN adding part 15 of the repeating device 4 sets "1(=ECN)" in the congestion notification bits 19 in the headers of the packets fed into the path directed to the terminal 1 of the repeating device 4. Then, as shown in FIG. 4(*c*), if the congestion detecting part 33 judges predictively from the statistical data that a congestion condition is taking place on the IP network 3 (Step S308), it notifies the congestion statistical information 17 to the call set-up processing part 29, based on the ratio of congestion notification bits 19 with a "1" to the total of congestion notification bits 19.

Based on the congestion statistical information 17, the call set-up processing part 29 adopts selectively a lower-speed coding method as appropriate in view of the severity of the congestion condition. The call set-up processing part 29 generates a coding method designation packet 41 by reflecting the coding method thus adopted, and notifies and communicates the coding method after change to be used for transmission to the opposed terminal 2 via the packet transmitting part 23 (Step S309).

Upon receiving a coding method change direction from the terminal 1 through the notification of the coding method after change, the opposed terminal 2 changes the coding method for the speech channel to the lower-speed coding method in accordance with the direction and resumes the call. Thus, as shown in FIG. 4(*d*), by enabling the coding method to be changed to a low-speed coding method, the traffic flowing into the repeating device 4 on the IP network 3 decreases in volume and the potential congestion condition whose occurrence has been predicted is removed, allowing the actual occurrence of the potential congestion to be avoided.

If the packet receiving part 24 receives a packet directing an existing call to be released (Step S6), the release direction packet for the call is sent to the call set-up processing part 29. Upon receiving the release direction packet, the call set-up processing part 29 performs the call release procedure by interacting with the opposed terminal 2 via the packet transmitting part 23 and the packet receiving part 24 (Step S310), and terminates the call (Step S311).

A congestion-responsive VoIP system according to the present invention and a congestion avoidance method for VoIP system can avoid congestion proactively by changing the coding method according to predictions. Since congestion conditions are contained in communication packets between terminals, congestion conditions during communication are notified accurately to the terminals, allowing the realization of a rational system that can avoid congestion based on the judgment and capacity of each terminal.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A congestion-responsive VoIP system, comprising:
a plurality of terminals, and an IP network which connects said plurality of terminals, wherein
said IP network comprises a repeater,
said repeater comprises a congestion value adding part for, based on the amount of data in speech data on said IP network, adding congestion data indicative of congestion conditions to speech packets that are transmitted to said terminals,
said terminals comprise a call set-up part for setting up a call and a detecting part for receiving said speech packets and detecting a congestion condition based on said congestion data in said speech packets, and
said call set-up part determines selectively a coding method for use in speech communications with the other terminal responsive to said congestion condition.

2. The congestion-responsive VoIP system as set forth in claim 1, wherein
said terminals further comprise a packet transmitting part, and said coding method is notified to the other terminal via said packet transmitting part.

3. The congestion-responsive VoIP system as set forth in claim 1, wherein
congestion data to be added to each speech packet is either a "1" or a "0."

4. The congestion-responsive VoIP system as set forth in claim 3, wherein,
said detecting part outputs the severity of congestion for said congestion condition to said call set-up part, based on the ratio of said speech packets to which the "1" has been added as said congestion data to the total.

5. The congestion-responsive VoIP system as set forth in claim 3, wherein,
said detecting part outputs the severity of congestion for said congestion condition to said call set-up part, based on the ratio of said speech packets to which the "1" has been added as said congestion data to the total, and
said call set-up part determines on a lower-speed coding method if said severity of congestion is higher.

6. The congestion-responsive VoIP system as set forth in claim 1, wherein
said repeater further comprises a congestion predicting part, and
said congestion predicting part determines the ratio of speech packets to which said congestion data will be added according to the transmission condition for said speech packets.

7. The congestion-responsive VoIP system as set forth in claim 6, wherein
said repeater further comprises a buffer monitoring part, and
said buffer monitoring part notifies said congestion predicting part of the transmission condition, based on the amount of data contained in said speech data.

8. A congestion avoidance method for VoIP system, comprising the steps of:
detecting the amount of data contained in speech data over the network using a repeater,
based on said amount of data, adding congestion data indicative of a congestion condition to speech packets to be transmitted from said repeater to a terminal, and
receiving said speech packets at said terminal, detecting a congestion condition based on congestion data contained in said speech packets, and determining selectively a coding method to be used for speech communications with the other terminal, based on the congestion condition.

9. The congestion avoidance method for VoIP system as set forth in claim 8, including
step of setting a "1" or a "0" as said congestion data.

10. The congestion-responsive VoIP system as set forth in claim 9, including
at said terminal, step of detecting the severity of congestion for a congestion condition based on the ratio of said speech packets to which "1" has been added as said congestion data to the total, and determining on a lower-speed coding method if said severity of congestion is higher.

11. The congestion avoidance method for VoIP system as set forth in claim 9, including
step of changing the ratio between said congestion data "1" and "0" to add to said speech packets over said network according to said amount of data.

12. The congestion avoidance method for VoIP system as set forth in claim 9, including
step of changing the ratio between said congestion data "1" and "0" to add to said speech packets over said network according to said amount of data, and
step of determining selectively a coding method based on the ratio of "1" and "0."

13. A terminal for a congestion-responsive VoIP system formed with a plurality of terminals and an IP network having a repeater for connecting said plurality of terminals, comprising:
a call set-up part for setting up a call, and
a detecting part for receiving said speech packets to which congestion data indicative of a congestion condition based on the amount of data in speech data over said IP network has been added and detecting the congestion condition based on said congestion data in said speech packets, wherein
said call set-up part determines selectively a coding method for use in speech communications with the other terminal responsive to said congestion condition.

14. The terminal for the congestion-responsive VoIP system as set forth in claim 13, further comprising
a packet transmitting part, comprising
notifying said coding method to the other terminal via said packet transmitting part.

15. The terminal for the congestion-responsive VoIP system as set forth in claim 13, wherein
congestion data to be added to each speech packet is either a "1" or a "0," and
said detecting part outputs the severity of congestion for said congestion condition to said call set-up part, based on the ratio of said speech packets to which the "1" has been added as said congestion data to the total.

16. The terminal for the congestion-responsive VoIP system as set forth in claim 15, wherein
said detecting part outputs the severity of congestion for said congestion condition to said call set-up part, based on the ratio of said speech packets to which the "1" has been added as said congestion data to the total, and
said call set-up part determines on a lower-speed coding method if said severity of congestion is higher.

17. The terminal for the congestion-responsive VoIP system as set forth in claim 13, wherein
said repeater further comprises a congestion predicting part, and
said congestion predicting part determines the ratio of speech packets to which said congestion data will be added according to the transmission condition for said speech packets.

18. The terminal for the congestion-responsive VoIP system as set forth in claim 17, wherein
said repeater further comprises a buffer monitoring part, and
said buffer monitoring part notifies said congestion predicting part of the transmission condition, based on the amount of data contained in said speech data.

* * * * *

UNITED STATES PATENT AND TRADEMARK OFFICE
CERTIFICATE OF CORRECTION

| | | |
|---|---|---|
| PATENT NO. | : 6,999,451 B2 | Page 1 of 1 |
| APPLICATION NO. | : 10/038654 | |
| DATED | : February 14, 2006 | |
| INVENTOR(S) | : Shinpei Yotsui | |

It is certified that error appears in the above-identified patent and that said Letters Patent is hereby corrected as shown below:

On the title page, amend Item (30), to read as follows:

--(30)  Foreign Application Priority Data

Jan. 12, 2001  (JP) ……………….. 2001-005447--.

Signed and Sealed this

Twenty-second Day of August, 2006

JON W. DUDAS
*Director of the United States Patent and Trademark Office*